(12) United States Patent
Fiala et al.

(10) Patent No.: US 8,083,525 B2
(45) Date of Patent: Dec. 27, 2011

(54) STEERING COLUMN MODULE WITH A TRANSPORT SECURING ELEMENT

(75) Inventors: Lukas Fiala, Luedenscheid (DE); Alexander Trinn, Luedenscheid (DE); Knut Moldenhauer, Hagen (DE)

(73) Assignee: Leopold Kostal GmbH & Co. KG, Luedenscheid (DE)

( * ) Notice: Subject to any disclaimer, the term of this patent is extended or adjusted under 35 U.S.C. 154(b) by 0 days.

(21) Appl. No.: 13/100,356

(22) Filed: May 4, 2011

(65) Prior Publication Data

US 2011/0207348 A1 Aug. 25, 2011

Related U.S. Application Data

(63) Continuation of application No. PCT/EP2009/065005, filed on Nov. 11, 2009.

(30) Foreign Application Priority Data

Nov. 15, 2008 (DE) .......................... 10 2008 057 588

(51) Int. Cl.
*H01R 39/00* (2006.01)
(52) U.S. Cl. .......................................... 439/15; 439/164
(58) Field of Classification Search .................... 439/15, 439/164
See application file for complete search history.

(56) References Cited

U.S. PATENT DOCUMENTS

| | | | | |
|---|---|---|---|---|
| 5,257,943 A * | 11/1993 | Ueno et al. | | 439/164 |
| 5,429,517 A * | 7/1995 | Bolen | | 439/164 |
| 5,562,466 A * | 10/1996 | Kato et al. | | 439/164 |
| 5,752,844 A | 5/1998 | Kawamoto | | |
| 5,785,541 A * | 7/1998 | Best et al. | | 439/164 |
| 5,871,366 A * | 2/1999 | Nishikigi et al. | | 439/164 |
| 6,042,405 A * | 3/2000 | Masuda et al. | | 439/164 |
| 6,309,233 B1 * | 10/2001 | Nakade et al. | | 439/164 |
| 6,368,127 B1 * | 4/2002 | Araki et al. | | 439/164 |
| 6,780,032 B2 * | 8/2004 | Rhein et al. | | 439/164 |
| 7,452,224 B1 * | 11/2008 | McDonald et al. | | 439/164 |

FOREIGN PATENT DOCUMENTS

DE 102006037943 A1 3/2008

* cited by examiner

*Primary Examiner* — Hae Moon Hyeon
(74) *Attorney, Agent, or Firm* — Brooks Kushman P.C.

(57) ABSTRACT

An electrical device such as a steering column module for a vehicle includes a connector, a movable element, and a transport securing element movable to a position in which the transport securing element blocks the movable element from moving. When the transport securing element is in the position blocking the movable element from moving the transport securing element also blocks the connector from connecting with an external connection element. The transport securing element is movable to a position in which the transport securing element does not block the movable element from moving. When the transport securing element is in the position not blocking the movable element from moving the transport securing element also does not block the connector from connecting with an external connection element.

11 Claims, 3 Drawing Sheets

STEERING COLUMN MODULE WITH A TRANSPORT SECURING ELEMENT

CROSS-REFERENCE TO RELATED APPLICATIONS

This application is a continuation of International Application No. PCT/EP2009/065005, published in German, with an international filing date of Nov. 11, 2009, which claims prior to DE 10 2008 057 588.7, filed Nov. 15, 2008; the disclosures of which are incorporated by reference.

TECHNICAL FIELD

The present invention relates to an electrical device such as a steering column module having a plug-and-socket connector, a movable element, and a transport securing element configured to lock the movable element in position.

BACKGROUND

An electrical device such as a steering column module includes a movable element. Danger exists as the movable element may move during transport of the device and thus becomes damaged. For instance, the movable element may be exposed to mechanical loads due to agitation or acceleration during transport of the device and thus becomes damaged.

A solution to this problem involves fixing the movable element in place to a fixed component of the device such that the movable element cannot move during transport of the device. A transport securing element is used to attach the movable element to a fixed component of the device such that movable element is held in place. The transport securing element is removed after transport of the device and before the device is placed in operation. After the transport securing element is removed, the transport securing element does not prevent the movable element from moving. As an example, the transport securing element may include screws which are mounted during transport of the device in order to retain the movable element in place and are removed after transport of the device to enable the movable element to move.

A problem with using a transport securing element is that sometimes it is forgotten that the transport securing element has to be removed after transport of the device. Removal of the transport securing element may be forgotten even when the transport securing element is brightly colored. If the device is operated in a situation where the transport securing device is not removed, then danger exists that parts of the device including the movable element may be damaged as a result of the movable element not being able to move while the device is operational and the movable element is intended to be moved for proper functioning of the device.

SUMMARY

An object of the present invention includes an electrical device such as a steering column module having a movable element and a transport securing element configured to lock the movable element in position in which operation of the device is prevented while the transport securing element is locking the movable element in position.

In carrying out the above object and other objects, the present invention provides a device having a connector, a fixed element, a movable element configured to be able to move relative to the fixed element, and a transport securing element. The transport securing element is configured to move between an engaged position in which the transport securing element attaches the movable element to the fixed element to thereby fix the movable element in place and a removed position in which the transport securing element does not prevent movement of the movable element. The transport securing element blocks the connector from connecting with an external connection element while the transport securing element is in the engaged position. The transport securing element does not block the connector from connecting with an external connection element while the transport securing element is in the removed position.

Also, in carrying out the above object and other objects, the present invention provides a steering column module having a connector, a movable element, and a transport securing element movable to a position in which the transport securing element blocks the movable element from moving. When the transport securing element is in the position blocking the movable element from moving the transport securing element also blocks the connector from connecting with an external connection element. The transport securing element is movable to a position in which the transport securing element does not block the movable element from moving. When the transport securing element is in the position not blocking the movable element from moving the transport securing element also does not block the connector from connecting with an external connection element.

Embodiments of the present invention provide an electrical device such as a steering column module having a plug connector and a movable element which can be locked by a transport securing apparatus. The transport securing apparatus prevents a mating plug connector from establishing a connection with the plug connector when the transport securing apparatus is in a position locking the movable element.

In accordance with embodiments of the present invention, an electrical device such as a steering column module includes a connector, a movable element, and a transport securing element in which the transport securing element is configured to fix the movable element in position. The transport securing element is further configured to block the connector from connecting with an external connector when the transport securing element fixes the moving element in position. To this end, the transport securing element at least partially covers the connector when the transport securing element fixes the moving element in position. The connector may be a plug-and-socket connector and the external connector may be a mating connector.

Prevention by the transport securing element of the insertion process between the plug-and-socket connector and the external mating connector provides an indication of the presence of the transport securing element in fixing the movable element in place. This indication is clearer when the transport securing element partly or even completely covers the plug housing of the plug-and-socket connector while the transport securing element fixes the movable element in position. The unconnected mating connector also calls attention to the presence of the transport securing element in fixing the movable element in place.

Blocking of the connection between the plug-and-socket connector and the external mating connector is advantageous when an electrical drive unit of the device such as an electric motor or an electromagnetic actuator is to be supplied with current via the plug-and-socket connector. The drive unit cannot be started until the mating connector is inserted into the plug-and-socket connector. As described, the mating connector cannot be inserted into the plug-and-socket connector until the transport securing element is removed from the movable element. While the transport securing element is attached to the movable element, the transport securing element fixes the movable element in place to a fixed component of the device and the transport securing element blocks the plug-and-socket connector from connecting with the mating connector. When the transport securing element is removed from the movable element, the movable element is free to move. Accordingly, mechanical damage to components of the device that are blocked by the transport securing element is prevented as the device is rendered inoperable as a result of the mating connector not being able to connect with the plug-and-socket connector until the transport securing element is removed.

It is advantageous when a controller for powering the drive unit via a connection between the plug-and-socket connector and the mating connector detects that the connection is not established and generates a signal indicative of same. For example, the signal may be a warning light or an error message represented as text or graphical information.

In embodiments of the present invention, the transport securing element can be formed as an individual component which can be attached to the device and is completely removable from the device. Alternatively, the transport securing element may be a component that is inseparably connected to the device and can be set in many different positions.

In many electrical devices having movable elements such as steering column modules of motor vehicles, the movable element of the device is not moved by an element belonging to the device. Rather, the movable element is moved by a rotational motion external to the device such as rotational motion caused by a human user. Damage to the device can also take place here by a transport securing element that has not been removed.

As is shown in the embodiments that follow, designs for an electrical device such as a steering column module according to embodiments of the present invention can also prevent damage in these cases by a timely error signal.

The above features, and other features and advantages of the present invention are readily apparent from the following detailed description thereof when taken in connection with the accompanying drawings.

DETAILED DESCRIPTION

Figure 1:
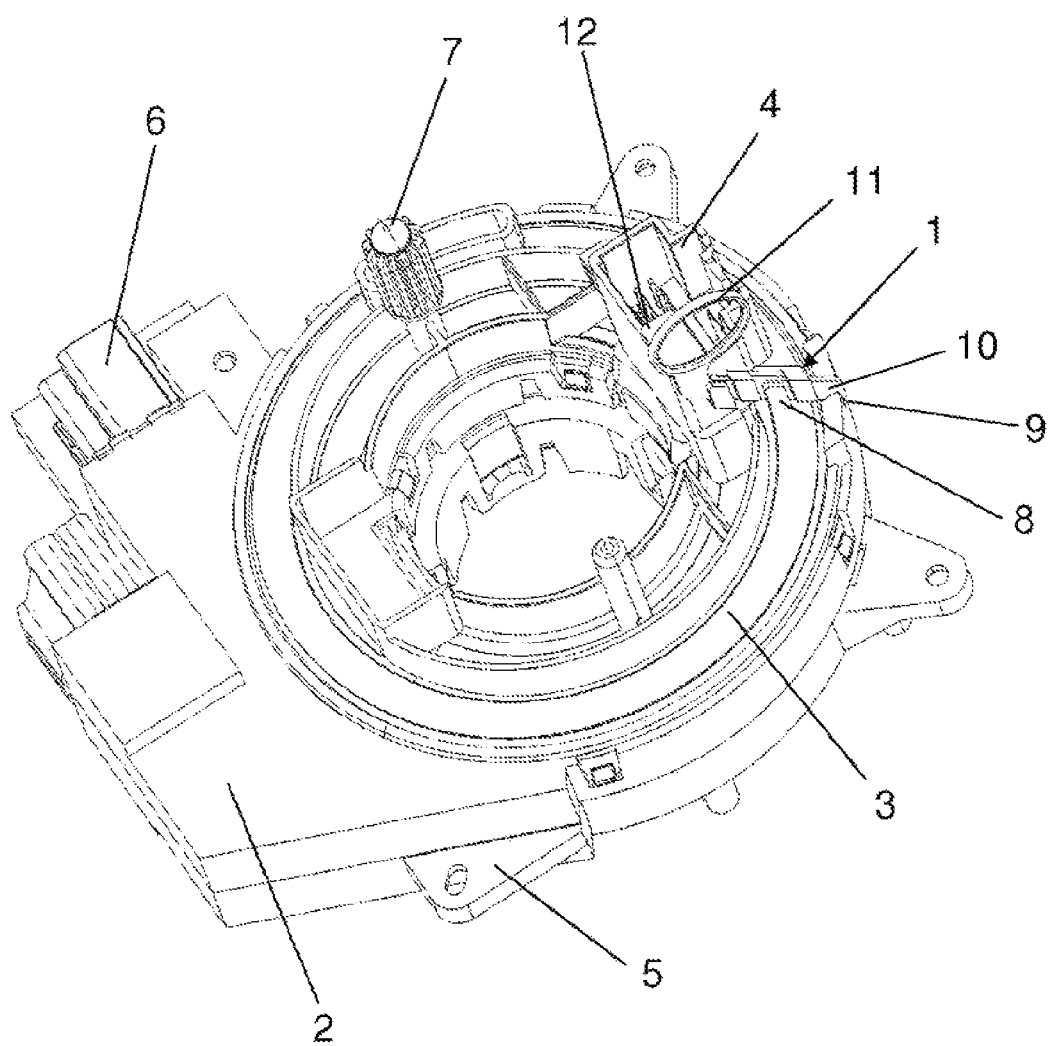
FIG. 1 illustrates an electrical device having a connector, a movable element, and a transport securing element in accordance with a first embodiment of the present invention in which the transport securing element is attached to the movable element such that the transport securing element fixes the movable element in place and blocks the connector from connecting with an external connector.
Figure 2:
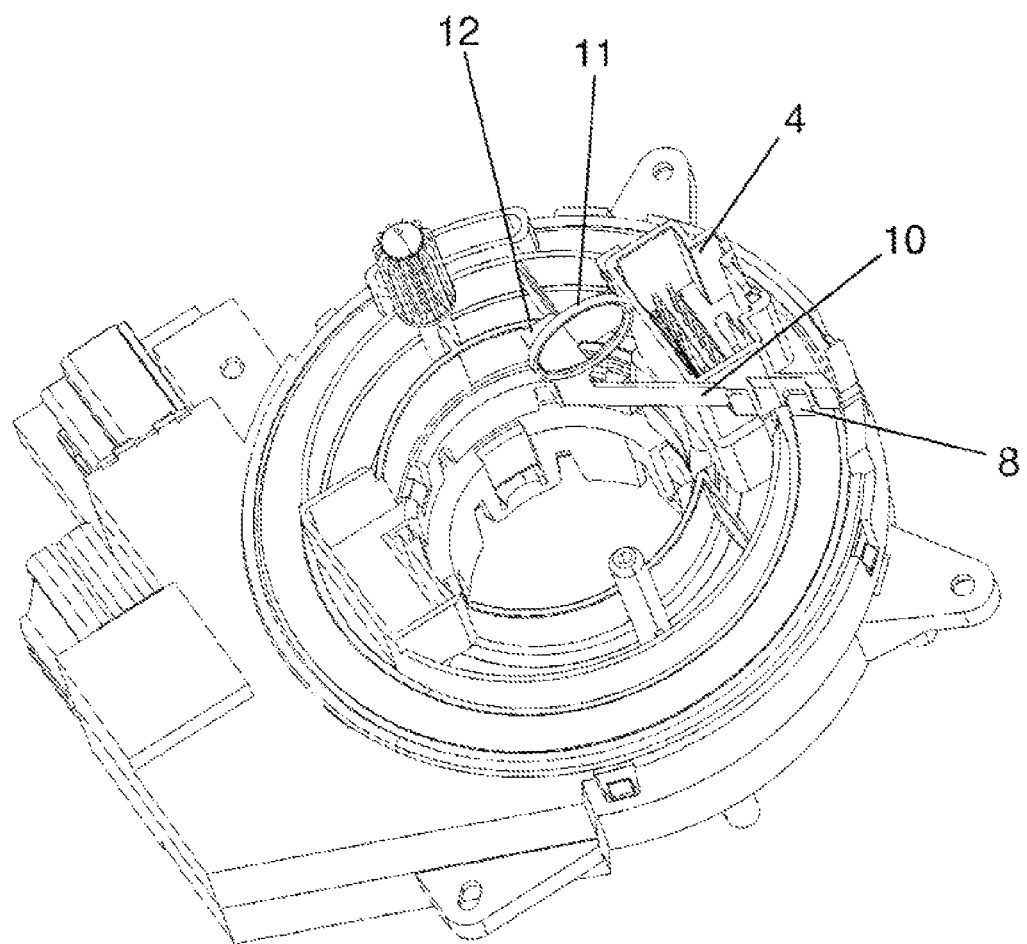
FIG. 2 illustrates the electrical device shown in FIG. 1 in which the transport securing element is removed from the movable element such that the transport securing element does not prevent the movable element from moving and does not prevent the connector from connecting with an external connector.
Figure 3:
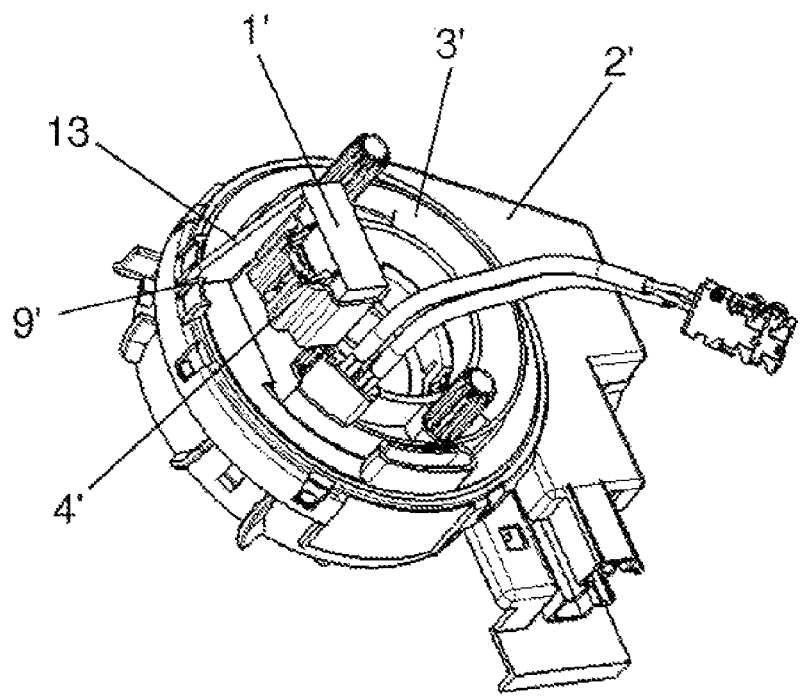
FIG. 3 illustrates an electrical device having a connector, a movable element, and a transport securing element in accordance with a second embodiment of the present invention in which the transport securing element is attached to the movable element such that the transport securing element fixes the movable element in place and blocks the connector from connecting with an external connector.
Figure 4:
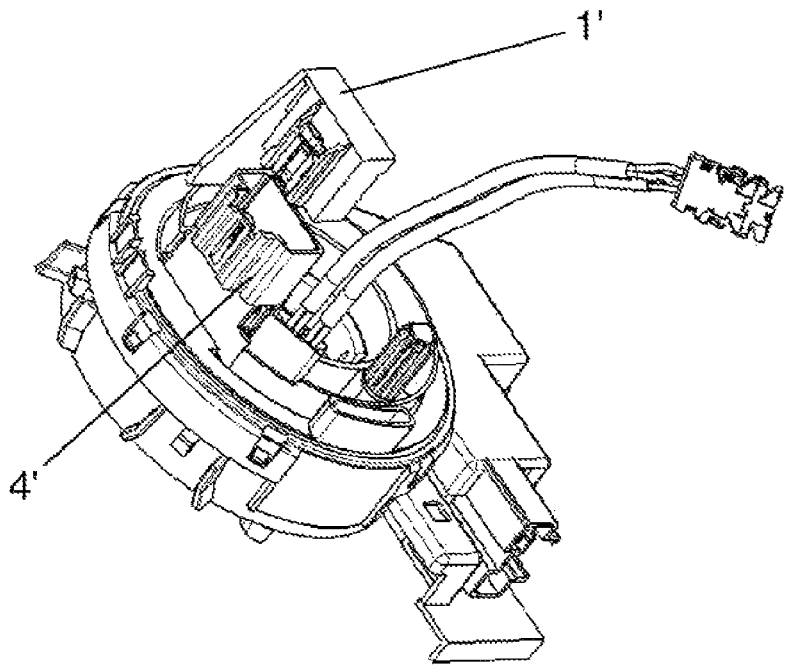
FIG. 4 illustrates the electrical device shown in FIG. 3 in which the transport securing element is removed from the movable element such that the transport securing element does not prevent the movable element from moving and does not prevent the connector from connecting with an external connector.

FIGS. 1 and 2 illustrate an electrical device in accordance with a first embodiment of the present invention and FIGS. 3 and 4 illustrate an electrical device in accordance with a second embodiment of the present invention. In both embodiments, the electrical device is a steering column module for a motor vehicle. Construction and functionality of steering column modules are known and will not be described here in detail. For example, DE 10 2006 037 943 A1 describes the construction and functionality of steering column modules.

Referring now to FIGS. 1 and 2, a steering column module in accordance with a first embodiment of the present invention will be described. The steering column module includes a connector 4, a movable element 3, and a transport securing element 1. Transport securing element 1 is configured to be in a position in which transport securing element 1 attaches movable element 3 to a fixed component of the steering column module to thereby fix movable element 3 in place. While transport securing element 1 fixes movable element 3 in place in this manner transport securing element 1 blocks connection of connector 4 with an external mating connector. When transport securing element 1 is removed from movable element 3, transport securing element 1 does not prevent movable element 3 from moving and does not prevent connection of connector 4 with an external connector.

In FIG. 1, transport securing element 1 is attached to movable element 3 such that transport securing element 1 fixes movable element 3 in place and blocks connector 4 from connecting with an external connector. In FIG. 2, transport securing element 1 is removed from movable element 3 such that transport securing element 1 does not prevent movable element 3 from moving and does not prevent connector 4 from connecting with an external connector.

Connector 4 may be a plug-and-socket connector. The external connector may be an external mating connector. Movable element 3 may be a movable housing part of the steering column module.

The steering column module further includes a fixed housing part 2. Fixed housing part 2 is fixed in the sense that it does not move. Transport securing element 1 is configured to attach movable housing part 3 to fixed housing part 2 such that movable housing part 3 is fixed in position. When transport securing element 1 is removed from movable housing part 3, transport securing element 1 does not prevent movable housing part 3 from moving. As such, in this event, movable housing part 3 may move relative to fixed housing part 2. Movable housing part 3 is formed essentially like a circular ring. Movable housing part 3 is arranged such that it can rotate on fixed housing part 2 when movable housing part 3 is not fixed in position.

The steering column module is to be installed on a steering column jacket (not shown) of a vehicle. To this end, fixed housing part 2 includes a plurality of flange-type connector elements 5. Connector elements 5 can be screwed to the steering column jacket. As these housing parts are immovably located inside the vehicle they will be designated as fixed housing parts.

The steering column module further includes an electric plug 6. Electrical and electronic components of the steering column module can be electrically connected through electric plug 6. Electric plug 6 is part of fixed housing part 2 and is thereby fixed in place.

Movable housing part 3 includes a connector dome 7. Connector dome 7 produces a mechanical connection to the steering wheel (not shown) of the vehicle. A plug-housing of plug-and-socket connector 4 is molded on movable housing part 3.

Fixed housing part 2 and movable housing part 3 together form a hollow space. A flat band cable (not shown) is inserted into the hollow space formed by fixed housing part 2 and movable housing part 3. Such an arrangement is known as a "spiral cassette." The cable serves to make the electrical connection for an air bag located on the steering wheel and electrically connects electric plug 6 to movable plug-and-socket connector 4.

The cable is inserted into the spiral cassette as a plurality of loop-type windings. The loop-type windings wind and unwind as the steering wheel turns. The arrangement of the windings is thereby determined by the rotational range of the steering wheel. If the rotational range is exceeded, then the cable stretches and breaks due to overloading. It is thus important that the spiral cassette is in a rotational position matching the assembly position of the steering wheel when being connected to the steering wheel. It can more advantageously be provided, for example, that during the assembly process both the steering wheel and the spiral cassette are located in the mid-position of its rotational range.

As the rotational range of the spiral cassette extends over multiple revolutions, it is readily apparent that it is not sufficient if the spiral cassette is located in a specific angular position relative to the fixed housing part of the steering column module when being attached to the steering wheel. This would be easy to determine by a visual observation. However, it is required that the spiral cassette be located within the proper "revolution round."

In order to assure that the spiral cassette is not rotated before assembly, the spiral cassette is fixed in the correct assembly position by transport securing element 1. In particular, transport securing element 1 attaches movable housing part 3 to a fixed component of the steering column module to thereby fix movable housing part 3 in place. As a result, movable housing part 3 cannot move relative to fixed housing part 2. Transport securing element 1 is only removed after the steering column module is connected both with the steering column and the steering wheel. Once transport securing element 1 is removed, transport securing element 1 does not prevent movable housing part 3 from moving.

As indicated above, in FIG. 1, transport securing element 1 is mounted in position to fix movable housing part 3 in place. In this position, transport securing element 1 not only fixes movable housing part 3 in place but also blocks plug-and-socket connector 4 from connecting with an external connector. Transport securing element 1 includes a bar-shaped section 10 on its first end section. Bar-shaped section 10 is held in this case by three molded hooks 8 on movable housing part 3. The openings of hooks 8 are oriented alternately in opposite directions so that bar-shaped section 10 can only be inserted sideways into hooks 8 or removed from hooks 8. A first end section of bar-shaped section 10 engages in a gap-like recess 9 on fixed housing part 2. The possibility of rotating movable housing part 3 with respect to fixed housing part 2 is thereby blocked.

Transport securing element 1 has a molded safety strip 12 on its second end section. Safety strip 12 at least partially covers the opening of plug-and-socket connector 4 when transport securing element 1 is mounted in position to fix movable housing part 3 in place. Thus, connection of a mating connector with plug-and-socket connector 4 is excluded by mounted transport securing element 1.

As indicated above, in FIG. 2, transport securing element 1 is removed from movable housing part 3. In this position, transport securing element 1 does not engage movable housing part 3 and therefore does not prevent movable housing part 3 from moving. Further, in this position, transport securing element 1 does not block plug-and-socket connector 4 from connecting with an external mating connector.

Removal of transport securing element 1 from movable housing part 3 is accomplished by pulling bar-shaped section 10 of transport securing element 1 sideways out of hooks 8 of movable housing part 3. As indicated in FIG. 2, this pulling out of transport securing element 1 is accomplished in a diagonal direction corresponding to hooks 8. As the end section of bar-shaped section 10 no longer penetrates into gap-like recess 9 of fixed housing part 2, the blocking of housing parts 2 and 3 against one another is thereby overridden. Plug-and-socket connector 4 is also simultaneously made available for a mating connector to be inserted therein.

Removal of transport securing element 1 from movable housing part 3 is aided by a molded ring 11. In particular, ring 11 facilitates removal of transport securing element 1 after successfully assembling the steering wheel through an opening formed in the steering wheel.

An electrical device such as a steering column module in accordance with embodiments of the present invention makes it possible to cost effectively ensure that transport securing element 1 is removed with a high degree of certainty. For instance, it is possible to ensure that transport securing element 1 is removed with a high degree of certainty during assembly of an associated air bag since otherwise the electrical connection of the air bag to connector 4 is not possible. If the air bag is assembled with transport securing element 1 not having been removed, then the missing air bag connection is routed to a warning alarm in the vehicle and an interrupted air bag circuit is detected and signaled.

Referring now to FIGS. 3 and 4, a steering column module in accordance with a second embodiment of the present invention will be described. This steering column module likewise includes a connector 4', a movable housing part 3', and a transport securing element 1'. Again, transport securing element 1' is configured to be in a position in which transport securing element 1' attaches movable housing part 3' to a fixed component of the steering column module to thereby fix movable housing part 3' in place. While transport securing element 1' fixes movable housing part 3' in place in this manner transport securing element 1' blocks connection of connector 4' with an external connector. Again, when transport securing element 1' is removed from movable housing part 3', transport securing element 1' does not prevent movable housing part 3' from moving and does not prevent connection of connector 4' with an external connector.

In FIG. 3, transport securing element 1' is attached to movable housing part 3' such that transport securing element 1' fixes movable housing part 3' in place and blocks connector 4' from connecting with an external connector. In FIG. 4, transport securing element 1' is removed from movable housing part 3' such that transport securing element 1' does not prevent movable housing part 3' from moving and does not prevent connector 4' from connecting with an external connector.

The arrangement of transport securing element 1' is adapted to the shape of plug-and-socket connector 4' such that transport securing element 1' can be inserted into the plug housing of plug-and-socket connector 4' as shown in FIG. 3. When transport securing element 1' is connected to plug-and-socket connector 4', a molded projection 13 on transport securing element 1' engages in a gap-like recess 9' of fixed housing part 2' and thereby blocks movable housing part 3' from moving relative to fixed housing part 2'. The removal of the blocking occurs by removal of transport securing element 1' from the plug housing of plug-and-socket connector 4' as shown in FIG. 4.

REFERENCE NUMBERS 1, 1' transport securing element
2, 2' fixed housing part
3, 3' movable housing part (movable element)
4, 4' plug-and-socket connector
5 flange-type connector element
6 electric plug
7 connector dome
8 hooks
9, 9' gap-like recess
10 bar-shaped section
11 ring
12 safety strip
13 molded projection As required, detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A device comprising:
a connector;
a fixed element;
a movable element configured to be able to move relative to the fixed element; and
a transport securing element movably connected to the movable element to move between an engaged position in which the transport securing element is connected to the movable element and attaches the movable element to the fixed element without the transport securing element being connected to the connector to thereby fix the movable element in place and a removed position in which the transport securing element is connected to the movable element and does not attach the movable element to the fixed element to thereby not prevent movement of the movable element relative to the fixed element;
wherein the transport securing element blocks the connector from connecting with an external connection element while the transport securing element is in the engaged position.

2. The device of claim 1 wherein:
the transport securing element does not block the connector from connecting with an external connection element while the transport securing element is in the removed position.

3. The device of claim 1 wherein:
the connector is a plug-and-socket connector.

4. The device of claim 1 wherein:
the connector is connected to the movable element such that the connector moves as the movable element moves.

5. The device of claim 1 wherein:
the device can be connected to a controller configured to detect and signal a missing connection between the connector and an external connection element.

6. The device of claim 1 wherein:
the movable element is electrically powered.

7. The device of claim 1 wherein:
the fixed element includes a fixed housing part and the movable element includes a movable housing part, wherein the movable housing part is configured to be able to rotationally move relative to the fixed housing part.

8. The device of claim 7 wherein:
the fixed housing part and the movable housing part together form a spiral cassette.

9. The device of claim 1 wherein:
the connector is a plug-and-socket connector having a plug housing;
wherein the transport securing element inserts into the plug housing of the plug-and-socket connector while the transport securing element fixes the movable element in place.

10. A steering column module comprising:
a connector;
a fixed housing part;
a movable housing part movable relative to the fixed housing part; and
a transport securing element movably connected to the movable housing part to move to a position in which the transport securing element is connected to the movable housing part and attaches the movable housing part to the fixed housing part without the transport securing element being connected to the connector to thereby block the movable housing part from moving;
the transport securing element movably connected to the movable housing part to move to another position in which the transport securing element is connected to the movable housing part and does not attach the movable housing part to the fixed housing part such that the transport securing element does not prevent movement of the movable housing part relative to the fixed housing part;
wherein when the transport securing element blocks the movable housing part from moving, the transport securing element also blocks the connector from connecting with an external connection element;
wherein when the transport securing element does not prevent movement of the movable housing part, the transport securing element also does not block the connector from connecting with the external connection element.

11. The module of claim 10 wherein:
the connector is a plug-and-socket connector having a plug housing;
wherein the transport securing element inserts into the plug housing of the plug-and-socket connector when the transport securing element blocks the movable housing part from moving.

* * * * *